(12) United States Patent
Adams et al.

(10) Patent No.: US 12,479,578 B2
(45) Date of Patent: Nov. 25, 2025

(54) ACTIVE DISPLAY INTERIOR VEHICLE SURFACES

(71) Applicant: The Boeing Company, Arlington, VA (US)

(72) Inventors: Scott Adams, Everett, WA (US); Edward Ryan Greene, Charleston, WA (US); Kjersta Larson-Smith, Seattle, WA (US)

(73) Assignee: THE BOEING COMPANY, Arlington, VA (US)

(*) Notice: Subject to any disclaimer, the term of this patent is extended or adjusted under 35 U.S.C. 154(b) by 0 days.

(21) Appl. No.: 18/528,229

(22) Filed: Dec. 4, 2023

(65) Prior Publication Data
US 2025/0178733 A1    Jun. 5, 2025

(51) Int. Cl.
| B64D 11/00 | (2006.01) |
|---|---|
| G09G 3/34 | (2006.01) |
| H04N 7/18 | (2006.01) |

(52) U.S. Cl.
CPC ......... *B64D 11/0015* (2013.01); *G09G 3/344* (2013.01); *H04N 7/183* (2013.01); *G09G 2380/12* (2013.01)

(58) Field of Classification Search
CPC ............ B64D 47/08; B64D 2011/0061; B64D 11/00152; B64D 11/00153; B64D 11/00151; B64D 11/0015; B64D 11/00; B64D 45/0053; B64D 11/00155; H04N 7/181; H04N 7/183; H04N 23/698; H04N 7/18; G09G 2380/12; G06V 20/56; G06F 3/1446; G08B 13/19645; G08B 13/19641; G08B 13/19647; G09F 21/06; B60K 35/00
See application file for complete search history.

(56) References Cited

U.S. PATENT DOCUMENTS

| 9,436,057 B2 | 9/2016 | Kang et al. |
|---|---|---|
| 10,259,580 B2 * | 4/2019 | Teo ...................... H04N 23/698 |
| 10,269,330 B2 | 4/2019 | Benchikhi |
| 11,289,718 B2 | 3/2022 | Harris et al. |

(Continued)

FOREIGN PATENT DOCUMENTS

| CN | 112305827 A | 2/2021 |
|---|---|---|
| JP | 2010204554 A * | 9/2010 |

(Continued)

OTHER PUBLICATIONS

Wolfrum, Georg, "Notification of Transmittal of the International Search Report and the Written Opinion of the International Searching Authority, or the Declaration," issued Mar. 17, 2025 in corresponding PCT Application No. PCT/US2024057456, 10 pages.

*Primary Examiner* — Koosha Sharifi-Tafreshi
(74) *Attorney, Agent, or Firm* — MH2 Technology Law Group LLP

(57) ABSTRACT

Techniques for providing a display inside a vehicle are presented. The techniques can include: providing an electrophoretic surface integrated into an internal component of the vehicle, where the electrophoretic surface is flame resistant, and where the electrophoretic surface is configured to display an image within the vehicle; and controlling the electrophoretic surface using an electronic controller communicatively coupled to the electrophoretic surface.

20 Claims, 6 Drawing Sheets

(56) References Cited

U.S. PATENT DOCUMENTS

| | | | |
|---|---|---|---|
| 2002/0093564 A1* | 7/2002 | Israel | H04N 7/106 |
| | | | 348/E7.086 |
| 2003/0025614 A1 | 2/2003 | Kahn | |
| 2003/0200546 A1* | 10/2003 | Keen | H04N 21/441 |
| | | | 348/E7.071 |
| 2017/0094167 A1* | 3/2017 | Riedel | H04N 13/302 |
| 2017/0176835 A1 | 6/2017 | Gupta et al. | |
| 2018/0081615 A1 | 3/2018 | Riedel | |
| 2018/0352196 A1* | 12/2018 | Marin-Martinod | H04N 7/181 |
| 2019/0188504 A1 | 6/2019 | Aihara et al. | |
| 2021/0006712 A1 | 1/2021 | Kim | |
| 2022/0334290 A1* | 10/2022 | Kim | C09K 21/14 |

FOREIGN PATENT DOCUMENTS

| | | | | |
|---|---|---|---|---|
| JP | 2013071278 A | | 4/2013 | |
| KR | 20180094426 A | * | 8/2018 | |
| KR | 102276674 B1 | * | 7/2021 | |
| WO | 2005/031450 A1 | | 4/2005 | |
| WO | WO-2019161647 A1 | * | 8/2019 | G02F 1/167 |
| WO | 2023/0219809 A1 | | 11/2023 | |

\* cited by examiner

300

ACTIVE DISPLAY INTERIOR VEHICLE SURFACES

FIELD

This disclosure relates generally to vehicle, such as aircraft, and to electronic displays.

BACKGROUND

Electrophoretic displays create images through electrostatic manipulation of pigment within microscopic capsules dispersed in a substrate. Each capsule is typically filled with hydrocarbon oil, which may be dyed to be opaque. Each capsule also includes a small amount of pigment particles of one or more colors and corresponding electrical charge(s). The substrate is sandwiched between electrodes that effectuate the electrostatic manipulation of the pigment particles within the capsules. The front electrode, on the side of the viewer of the display, is typically transparent or translucent. The back electrode may be divided up according to addressable pixels, and appropriate voltages may be applied between the pixel electrodes and the front electrode to form an image on the display. The pigment particles migrate electrophoretically between the front of the capsule (facing the viewer) and the back of the capsule (away from the viewer) according to the electrostatic manipulation provided by the electrodes. When pigment particles of a particular color (and charge) are at the front of the capsule, their color is visible to the viewer. Conversely, when pigment particles of a particular color are at the back of the capsule, the capsule as viewed from the front of the display takes on the color of the opaque oil and/or the color of any particles of a different color (and charge) that are at the front of the capsule. Thus, various colors may be displayed according to specific charge manipulations.

Electronic displays are most commonly implemented using LED or LCD technology. Such displays may be are capable of changing content on demand, but they require significant power, are large in footprint, and have inconsistent visibility under differing observation conditions (e.g., ambient brightness).

Vehicles, such as aircraft, may include various displays. However, pilots have limited visibility during ground operations and must rely on ground crews for situational awareness. Further, trends toward increased seat density have led to passenger dissatisfaction at being confined while onboard an aircraft. Paper menus may be passed out and collected, passengers often scramble to exit the plane to learn of connecting flights, and there is often tension between passengers who may wish to look out the window on a long flight and passengers annoyed by the very bright sunlight shining in.

SUMMARY

According to various embodiments, a system for providing a display inside a vehicle is presented. The system includes: an electrophoretic surface integrated into an internal component of the vehicle, where the electrophoretic surface is flame resistant, and where the electrophoretic surface is configured to display an image within the vehicle; and an electronic controller communicatively coupled to the electrophoretic surface.

Various optional features of the above system embodiments include the following. The electrophoretic surface may include an electrophoretic film. The electrophoretic surface may include an electrophoretic coating. The vehicle may include an aircraft, and the component may include at least one of: a cabin wall, a luggage bin, a seatback, a portion of a flight deck, a cabin floor, a divider between aircraft sections, a cabin ceiling, an overhead bin, a lavatory interior, a lavatory door, a tray cart surface, a seat back, a tray table, a window shade, or an overhead area. The system may further include a camera communicatively coupled to the controller, where the electrophoretic surface is configured to display an image captured by the camera. A field of the view of the camera may include an area outside of the vehicle. The vehicle may include an airplane, where the field of view includes an area beneath a wing of the aircraft, where the electrophoretic surface is positioned above the wing of the aircraft, and where the electrophoretic surface displays an image of the area beneath the wing of the aircraft unobstructed by the wing. The vehicle may include an airplane, where the field of view includes an area above the aircraft, and where the electrophoretic surface is configured to display an image of the area above the aircraft. The electrophoretic surface may be configured to provide a virtual window on the airplane. A field of view of the camera may include an area inside of the vehicle.

According to various embodiments, a method of providing a display inside a vehicle is presented. The method includes: providing an electrophoretic surface integrated into an internal component of the vehicle, where the electrophoretic surface is flame resistant; providing an electronic controller communicatively coupled to the electrophoretic surface; and displaying an image, by the electrophoretic surface, within the vehicle.

Various optional features of the above method embodiments include the following. The electrophoretic surface may include an electrophoretic film. The electrophoretic surface may include an electrophoretic coating. The vehicle may include an aircraft, and the component may include at least one of: a cabin wall, a luggage bin, a seatback, a portion of a flight deck, a cabin floor, a cabin overhead area, or a divider between aircraft sections. The image may be captured by a camera communicatively coupled to the controller. A field of the view of the camera may include an area outside of the vehicle. The vehicle may include an airplane, where the field of view includes an area beneath a wing of the aircraft, where the electrophoretic surface is positioned above the wing of the aircraft, and where the image is of the area beneath the wing of the aircraft and unobstructed by the wing of the aircraft. The vehicle may include an airplane, where the field of view includes an area above the aircraft, and where the image is of the area above the aircraft. The electrophoretic surface may be configured to provide a virtual window on the airplane. A field of view of the camera may include an area inside of the vehicle, and the image may be of the area inside of the vehicle.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DESCRIPTION OF THE EXAMPLES

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

Some embodiments integrate electrophoretic display surfaces into interior components of an aircraft. According to various embodiments, the electrophoretic display surfaces may include electrophoretic films and/or electrophoretic coatings. Embodiments that utilize electrophoretic displays can hold their appearance with no power required until the display is changed. Consequently, such embodiments require far less power than traditional LED or LCD displays. According to various embodiments, one or more electrophoretic display surfaces on a flight deck of an aircraft may allow pilots to turn their heads and virtually see-through the aircraft fuselage for improved ground handling safety. According to various embodiments, one or more electrophoretic display surfaces in the passenger cabin of an aircraft may be used to create virtual passenger windows and/or virtually transparent or simulated scenes on walls, floors, overhead areas, and/or other aircraft components. According to various embodiments, optical illusions, much like a large wall mirror in a restaurant, can be provided for more open and less confining cabin feel. According to various embodiments, electrophoretic display surfaces may be used for functional purposes, such as serving as a mirror for a passenger, displaying a meal menu, displaying personalized connecting flight information, or helping a passenger find their seat. According to various embodiments, electrophoretic display surfaces may be used to provide decorative images, such as artwork. Thus, according to various embodiments, electrophoretic display surfaces on the interior of an aircraft may improve pilot visibility, alleviate passenger dissatisfaction, and/or provide passenger information.

These and other features and advantages are shown and described herein in reference to the accompanying figures.

Note that although various embodiments are illustrated in reference to aircraft such as commercial airplanes, embodiments are not so limited. In general, embodiments may be used on interior surfaces of any vehicle, including by way of non-limiting example, rotary-wing aircraft such as helicopters, trains, automobiles, and tractor-trailer trucks.

Figure 1:
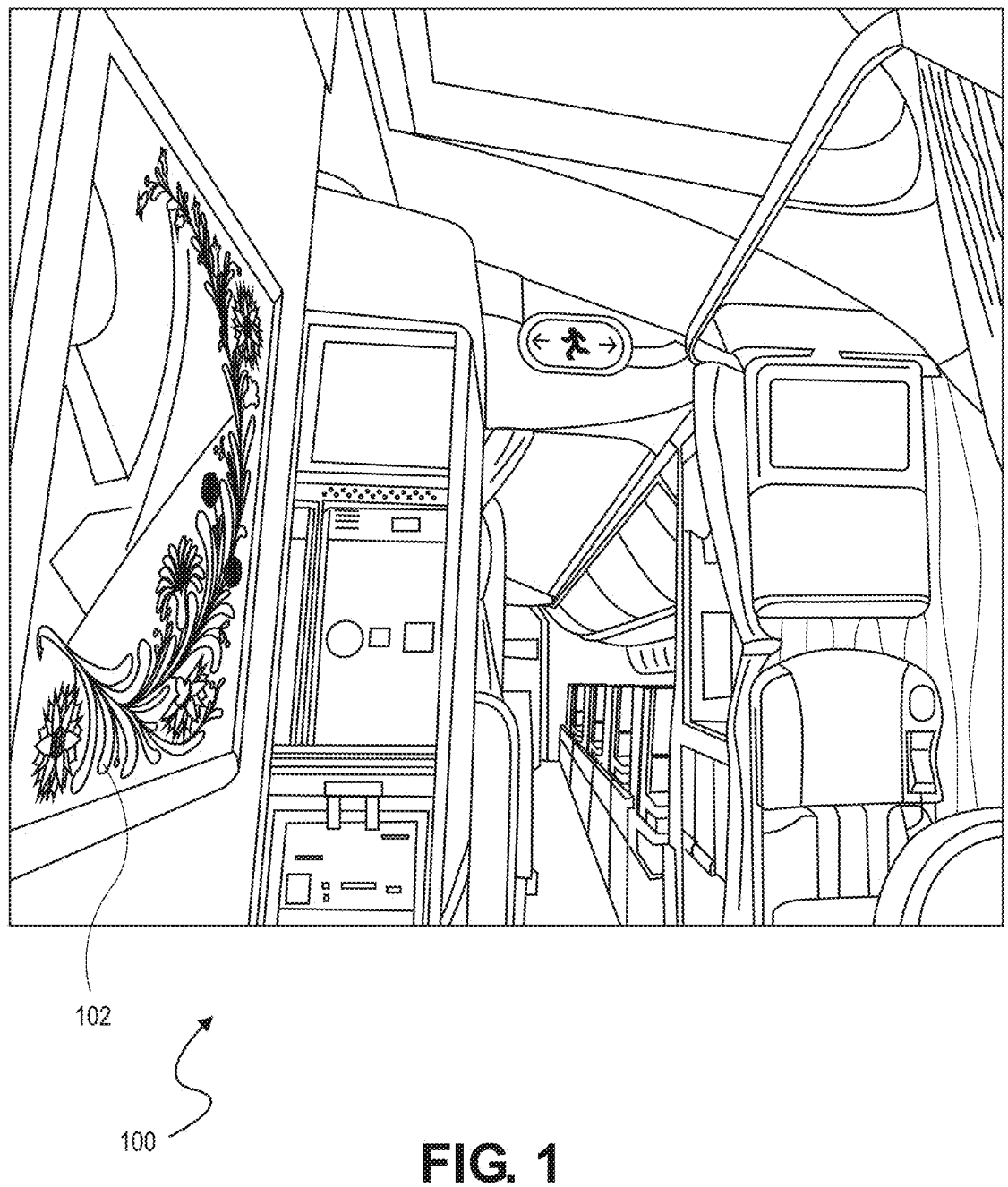
FIG. 1 illustrates an electrophoretic surface display inside an aircraft, according to various embodiments.

FIG. 1 is an illustration 100 an electrophoretic surface display 102 inside an aircraft, according to various embodiments. The electrophoretic surface display 102 is shown as being integrated into the surface of an aircraft component, namely, a passenger cabin wall. Although shown as being bounded by a decorative frame, embodiments are not so limited. For example, the electrophoretic surface display 102 may be implemented without a frame such that it can seamlessly blend into the aircraft component in which it is integrated. According to various embodiments, the electrophoretic surface display 102 may be implemented using an electrophoretic film that conforms to the shape of the component surface, or an electrophoretic coating, which may be applied to the surface of the aircraft component. Note that the electrophoretic surface display 102 may not require power once an image is displayed. Instead, the electrophoretic surface display 102 may continue to show an image without requiring any power. Power may be applied in order to change a displayed image to a different image for display. Further, the electrophoretic surface display 102 may not emit light, such that it may resemble a printed image, and the image presented on electrophoretic surface display 102 may be visible in any ambient light condition, including in the presence of full sunlight.

Figure 6:
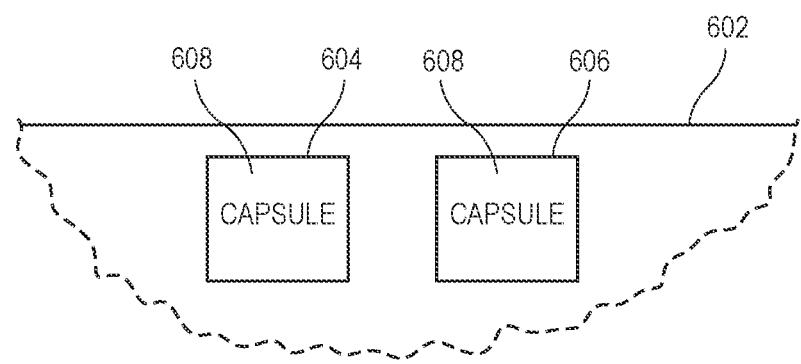
FIG. 6 is a schematic block diagram of a cross-section of a portion of an electrophoretic surface that includes capsules that are filled an anionic flame-resistant fluid, according to various embodiments.
Figure 7:
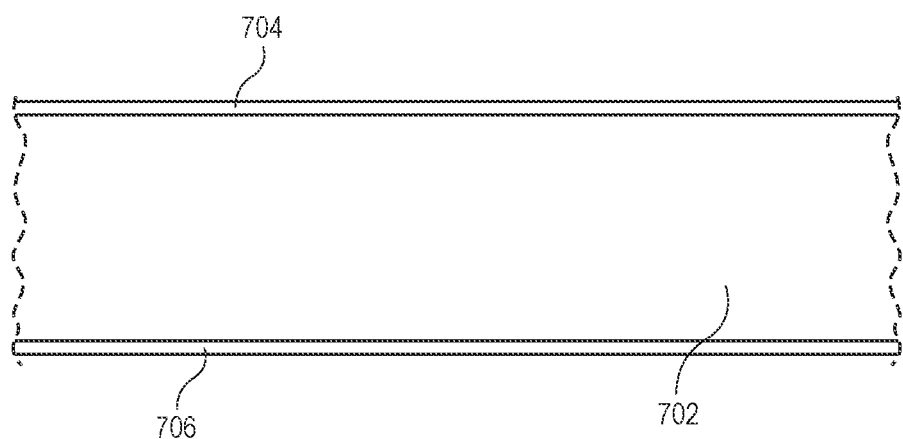
FIG. 7 is a schematic diagram of a cross-section of a portion of an electrophoretic surface that is sandwiched between flame-resistant films, according to various embodiments.

According to various embodiments, the electrophoretic surface display 102 may be flame resistant. According to some embodiments, instead of a flammable hydrocarbon oil filling the capsules in the electrophoretic surface display 102, a different, flame-resistant liquid may be used. Such liquid may be an anionic flame-resistant fluid, for example. FIG. 6 is a schematic block diagram of a cross-section of a portion of an electrophoretic surface 602 that includes capsules 604, 606 that are filled with an anionic flame-resistant fluid 608, according to various embodiments. The schematic diagram of FIG. 6 is not to scale and does not convey any particular capsule shape. In addition, or in the alternative, according to some embodiments, the electrophoretic surface display 102 may be covered on the front and/or back by one or more types of flame-resistant film, e.g., thin glass. For example, according to some embodiments, the electrophoretic surface display 102 may be sandwiched between such flame-resistant films. FIG. 7 is a schematic diagram of a cross-section of a portion of an electrophoretic surface 702 that is sandwiched between flame-resistant films 704, 706, according to various embodiments. The schematic diagram of FIG. 7 is not to scale.

The electrophoretic surface display 102 may be integrated into any component of the aircraft. By way of non-limiting examples, the electrophoretic surface display 102 may be integrated into a cabin wall, a luggage bin, a seatback, a portion of a flight deck, a cabin floor, a cabin overhead area, or a divider between aircraft sections.

The electrophoretic surface display 102 may display any of a variety of informational and/or decorative images. For example, the electrophoretic surface display 102 may display any, or any combination, of: a meal menu, connecting flight information, signage, advertisements, or decorative images such as artwork or optical illusions. The electrophoretic surface display 102 may be present on any surface of the airplane to show images in proximity to individual or groups of passengers, e.g., on the cabin wall, floor, ceiling, overhead bin, lavatory interior or door, tray cart surfaces, seat back, tray table, window shades, or overhead area. Images may also be individualized, such as, by way of non-limiting examples: personalized food menus, personalized connecting flight information, personalized advertisements, personalized messages, personalized flight status (e.g., for connecting flights), personalized frequent flier status, and/or personalized passenger identifications, which may be anonymized. Images may be dynamic. For example, a electrophoretic display may display a beach scene, with gentle waves lapping at the sand.

According to some embodiments, the electrophoretic surface display 102 may be communicatively coupled to one or more cameras, positioned to have field(s) of view inside and/or outside of the aircraft, and may display images captured by the camera(s).

Examples that utilize one or more cameras having field(s) of view inside the aircraft are discussed presently. For example, the electrophoretic surface display 102 may show images of the interior of the cabin, in analogy to a large mirror in a restaurant, so as to make the cabin appear larger than it is. As another example, the electrophoretic surface display 102 may act as a personal mirror and show an image of a particular passenger on a cabin wall next to the passenger, e.g., upon activation by the passenger. As yet another example, the electrophoretic surface display 102 may be integrated into a divider between sections of the aircraft cabin, and, when the aircraft is stationary, for example, may appear transparent by displaying, on one side of the barrier, the field of view on the other side of the barrier, and vice versa. According to such embodiments, the electrophoretic surface display 102 may display other images, or no images so as to appear opaque, when the aircraft is in motion.

Examples that utilize one or more cameras with field(s) of view outside of the aircraft are discussed presently. According to some embodiments, the electrophoretic surface display 102 may act as a virtual window of the aircraft, and allow passengers and/or pilots to virtually see through the fuselage to view images of one or more fields of view outside the aircraft. According to this example, the fields of view may include areas over the aircraft, under the aircraft, and/or next to the aircraft. That is, for such embodiments, the electrophoretic surface display 102 may be integrated on the floor of the aircraft and display a field of view under the aircraft, be integrated in the cabin wall and display a field of view next to the aircraft, and/or be integrated on the overheard area of the aircraft and display a field of view over the aircraft. Such embodiments in the floor may, for example, display a moving (e.g., real time) view of the ground from the viewpoint of the high-altitude aircraft, potentially showing clouds beneath the aircraft in addition or in the alternative. Such embodiments in the wall or ceiling may, for example, show clouds during the day and stars during the night. According to some embodiments, the fields of view may include areas under one or more wings of the aircraft, and the electrophoretic surface display 102 may be positioned between a direct line from such areas to an aircraft occupant, such that the aircraft occupant may be able to virtually see through the cabin wall and aircraft wing and see the field of view below the wing displayed on the electrophoretic surface display 102. Note that embodiments according to this paragraph advantageously allow aircraft occupants to view outside, without permitting harsh sunlight to enter through the display surfaces.

Embodiments are not limited to the example images expressly disclosed herein. Other images, whether originating from the field(s) of view of one or more cameras or not, fall within the scope of the invention.

Embodiments may present one or more safety advantages. For example, electrophoretic displays that are readily viewable by passengers provide for immediate communication, which may be important in emergency situations. As another example, electrophoretic displays that may ordinarily show decorative images may be repurposed to display information, e.g., in an emergency. As yet another example, electrophoretic displays can provide information to passengers while the passengers remain seated, thereby reducing aisle congestion, which may increase safety. As yet another example, displaying decorative images may have the effect of soothing stressed passengers.

Figure 2:
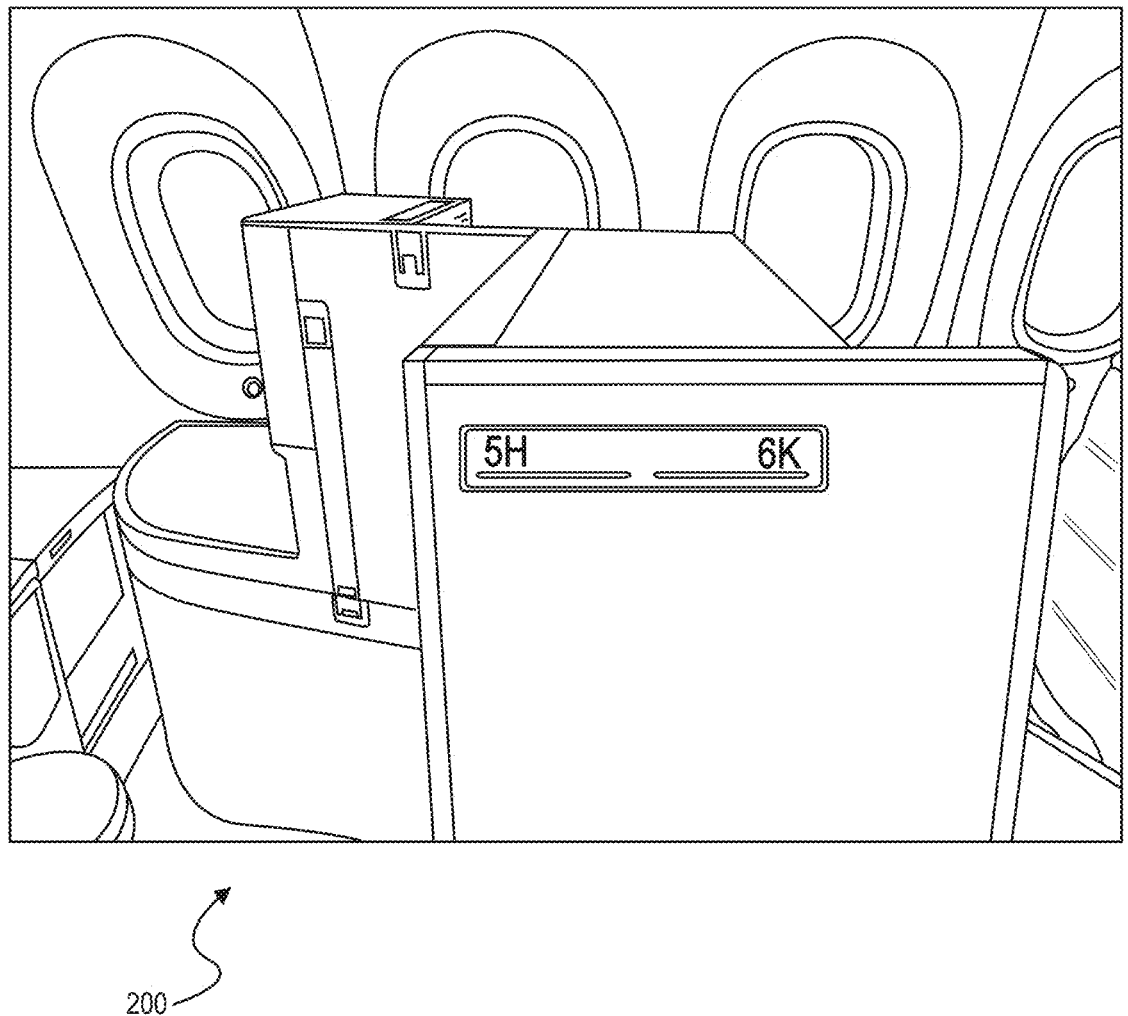
FIG. 2 illustrates an electrophoretic surface display inside an aircraft, according to various embodiments.

FIG. 2 illustrates an electrophoretic surface display 200 inside an aircraft, according to various embodiments. As shown in FIG. 2, the electrophoretic surface display 200 includes aircraft cabin placarding. Such embodiments may allow an airline to change placarding depending on the route that it is flying. For example, the route between Los Angeles and Japan could have English and Japanese placards, whereas the placarding in the same aircraft scheduled for Los Angeles to Soul may be changed to have English and Korean instructions.

Figure 3:
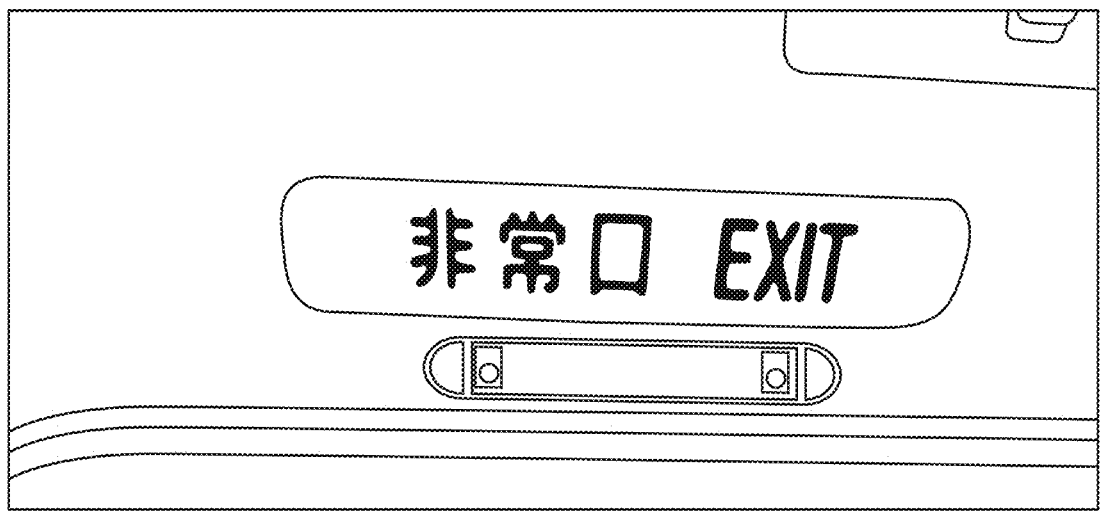
FIG. 3 illustrates an electrophoretic surface display inside an aircraft, according to various embodiments.

FIG. 3 illustrates an electrophoretic surface display 300 inside an aircraft, according to various embodiments. In particular, FIG. 3 illustrates another example of aircraft placarding. The electrophoretic surface display 300 is shown as being integrated into an aircraft panel, e.g., such that the rear electrode arrow of the electrophoretic surface display 300 is in contact with the aircraft cabin wall component. Note that embodiments such as are illustrated according to FIG. 3 have the benefit of being able to change functional information in the aircraft itself, as shown in FIG. 3, an exit location, and may continue to display such functional information in an emergency situation when power is lost. This presents a clear advantage over changeable displays based on LED or LCD technology.

Figure 4:
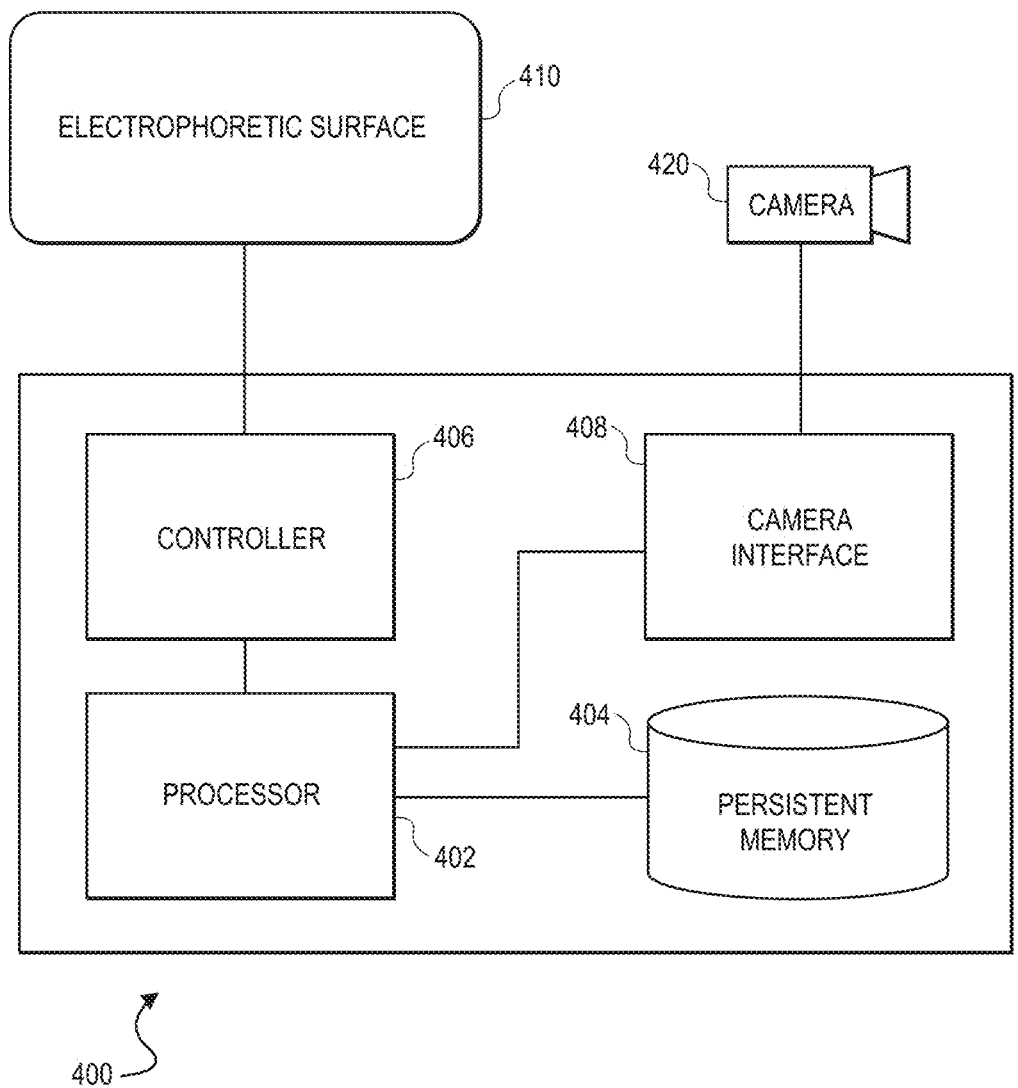
FIG. 4 is a schematic diagram of an electrophoretic surface display system inside a vehicle, according to various embodiments.

FIG. 4 is a schematic diagram of an electrophoretic surface display system 400 inside a vehicle, according to various embodiments. The system 400 may be used to display any image, including, but not limited to, those shown and described herein in reference to FIGS. 1-3. In particular, the system 400 may be used to display one or more images on the included electrophoretic surface display 410. The system 400 includes an electronic processor 402 communicatively coupled to an electronic non-transitory persistent memory 404. The persistent memory 404 can store program instructions which, when executed by the electronic processor 402, may configure the electronic processor 402 to perform actions as disclosed herein, e.g., as shown and described in reference to FIG. 5. The persistent memory 404 may store data representing images that may be displayed by the system 400 as disclosed herein. The system 400 also includes an electronic controller 406 communicatively coupled to the electronic processor 402. The electronic controller 406 provides electronic signals to the electrophoretic surface display 410. Such electronic signals activate the electrodes of the electrophoretic surface display 410 to remove or erase one or more current image(s) and present or display one or more different image(s). Images presented on the electrophoretic surface display 410 may originate from data stored in the persistent memory 404 or from a field of view of the one or more communicatively coupled camera(s) 420.

Figure 5:
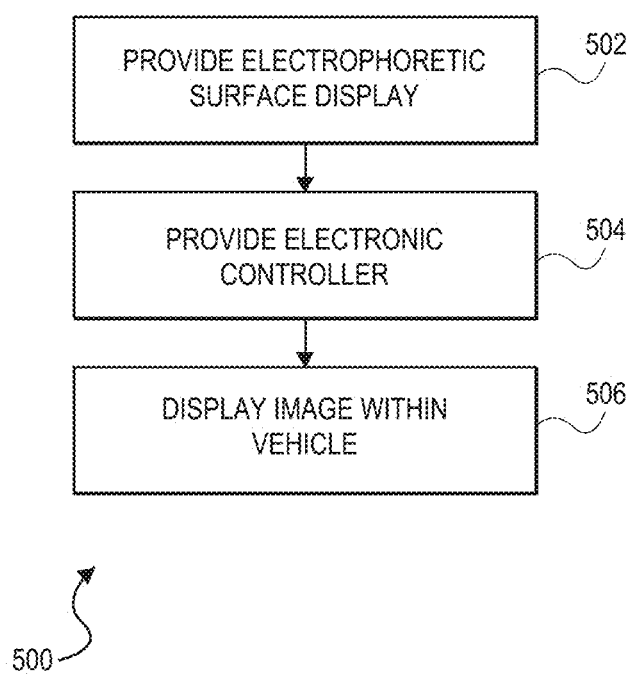
FIG. 5 is a flow diagram of a method for providing an electrophoretic surface display inside a vehicle, according to various embodiments.

FIG. 5 is a flow diagram of a method 500 for providing an electrophoretic surface display inside a vehicle, according to various embodiments. The method 500 may be implemented using a system, such as the system 400 as shown and described herein in reference to FIG. 4. The method 500 may be used to display any image, including, but not limited to, those shown and described herein in reference to FIGS. 1-3.

At 502, the method 500 includes providing an electrophoretic surface integrated into an internal component of the vehicle. The electrophoretic surface may be provided as shown and described in reference to any of FIGS. 1-3, for example. The electrophoretic surface may be flame resistant, as described herein.

At 504, the method 500 includes providing an electronic controller communicatively coupled to the electrophoretic surface. The electronic controller may be implemented as shown and described herein in reference to FIG. 5, e.g., in reference to the electronic controller 406.

At 506, the method 500 includes displaying an image, by the electrophoretic surface, within the vehicle. The image may be displayed as shown and described in reference to any of FIGS. 1-3, for example. For example, the image may originate from stored data representing the image, and/or from a field of view from one or more communicatively coupled cameras.

Certain examples can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), flash memory, and magnetic or optical disks or tapes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by an electronic processor.

These computer readable program instructions may be provided to a processor of a general-purpose computer, special purpose computer, or other programmable data processing apparatus to produce a machine, such that the instructions, which execute via the electronic processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on a user's computer, partly on the user's computer, as a stand-alone software package, partly on the user's computer and partly on a remote computer or entirely on the remote computer or server.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A system for providing a display inside a vehicle, the system comprising:
    an electrophoretic surface integrated into a wall of the vehicle, wherein the electrophoretic surface comprises capsules filled by an anionic flame-resistant fluid, wherein the electrophoretic surface is flame resistant, and wherein the electrophoretic surface is configured to display an image within the vehicle;

an electronic controller communicatively coupled to the electrophoretic surface; and a camera communicatively coupled to the electronic controller, wherein the electrophoretic surface is configured to display an image captured by the camera, wherein a field of view of the camera comprises an area outside the vehicle, wherein the electrophoretic surface is positioned between a line from the area outside the vehicle to a vehicle occupant, whereby the vehicle occupant is able to virtually see through the wall of the vehicle and see the area outside the vehicle displayed on the electrophoretic surface.

2. The system of claim 1, wherein the electrophoretic surface comprises an electrophoretic film.

3. The system of claim 1, wherein the electrophoretic surface comprises an electrophoretic coating.

4. The system of claim 1, wherein the vehicle comprises an aircraft, and wherein the wall comprises at least one of: a cabin wall, a cabin floor, or a cabin ceiling.

5. The system of claim 1,
wherein the vehicle comprises an airplane,
wherein the field of view comprises an area beneath a wing of the aircraft,
wherein the electrophoretic surface is positioned above the wing of the aircraft, and
wherein the electrophoretic surface displays an image of the area beneath the wing of the aircraft unobstructed by the wing.

6. The system of claim 1,
wherein the vehicle comprises an airplane,
wherein the field of view comprises an area above the aircraft, and
wherein the electrophoretic surface is configured to display an image of the area above the aircraft.

7. The system of claim 1, wherein the electrophoretic surface is configured to provide a virtual window on the airplane.

8. The system of claim 1, wherein the field of view of the camera further comprises an area inside of the vehicle.

9. A method of providing a display inside a vehicle, the method comprising:
providing an electrophoretic surface integrated into a wall of the vehicle, wherein the electrophoretic surface comprises capsules filled by an anionic flame-resistant fluid, and wherein the electrophoretic surface is flame resistant;
providing an electronic controller communicatively coupled to the electrophoretic surface;

providing a camera communicatively coupled to the electronic controller; and displaying an image, by the electrophoretic surface, within the vehicle, as captured by the camera, wherein a field of view of the camera comprises an area outside the vehicle, wherein the electrophoretic surface is positioned between a line from the area outside the vehicle to a vehicle occupant, whereby the vehicle occupant is able to virtually see through the wall of the vehicle and see the area outside the vehicle displayed on the electrophoretic surface.

10. The method of claim 9, wherein the electrophoretic surface comprises an electrophoretic film.

11. The method of claim 9, wherein the electrophoretic surface comprises an electrophoretic coating.

12. The method of claim 9, wherein the vehicle comprises an aircraft, and wherein the wall comprises at least one of: a cabin wall, a cabin floor, or a cabin ceiling.

13. The method of claim 9,
wherein the vehicle comprises an airplane,
wherein the field of view comprises an area beneath a wing of the aircraft,
wherein the electrophoretic surface is positioned above the wing of the aircraft, and
wherein the image is of the area beneath the wing of the aircraft and unobstructed by the wing of the aircraft.

14. The method of claim 9,
wherein the vehicle comprises an airplane,
wherein the field of view comprises an area above the aircraft, and
wherein the image is of the area above the aircraft.

15. The method of claim 9, wherein the electrophoretic surface is configured to provide a virtual window on the airplane.

16. The method of claim 9, wherein the field of view of the camera further comprises an area inside of the vehicle, and wherein the image further comprises the area inside of the vehicle.

17. The system of claim 1, wherein the electrophoretic surface is sandwiched between flame-resistant films.

18. The method of claim 9, wherein the electrophoretic surface is sandwiched between flame-resistant films.

19. The system of claim 17, wherein the flame-resistant films comprise glass.

20. The method of claim 18, wherein the flame-resistant films comprise glass.

* * * * *